Dec. 27, 1955      D. SINKLER      2,728,550
VALVE FOR CORROSIVE FLUIDS
Filed May 16, 1951      3 Sheets-Sheet 1
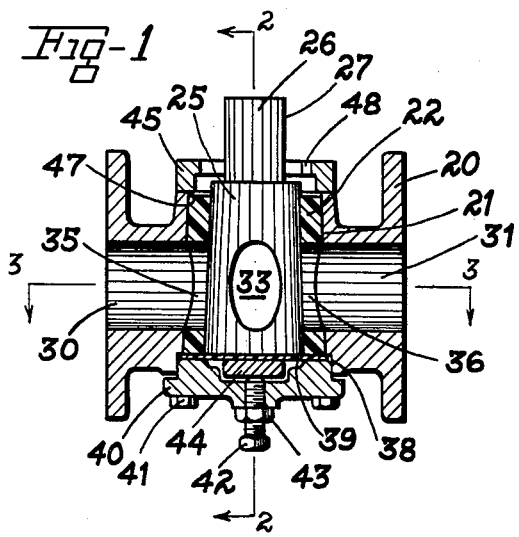
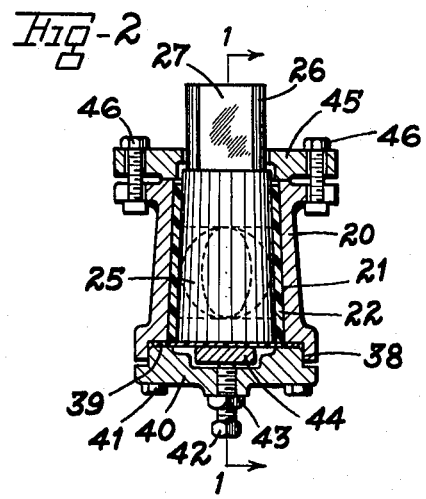
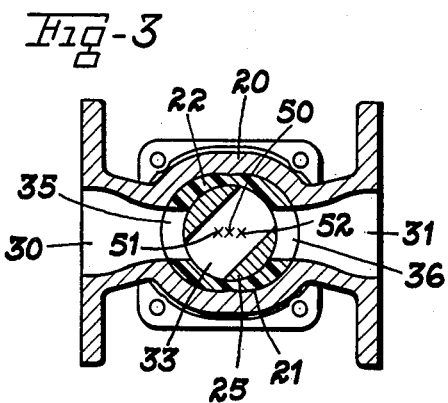
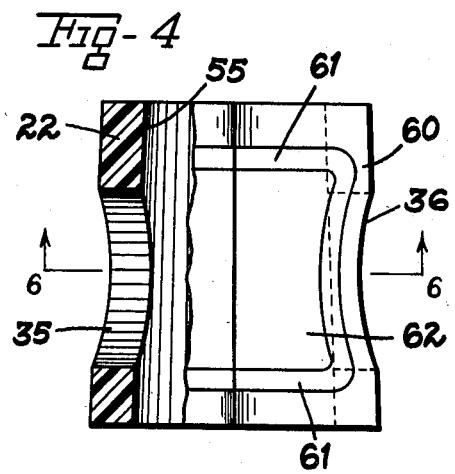
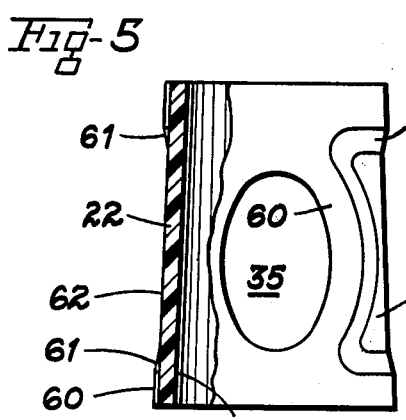
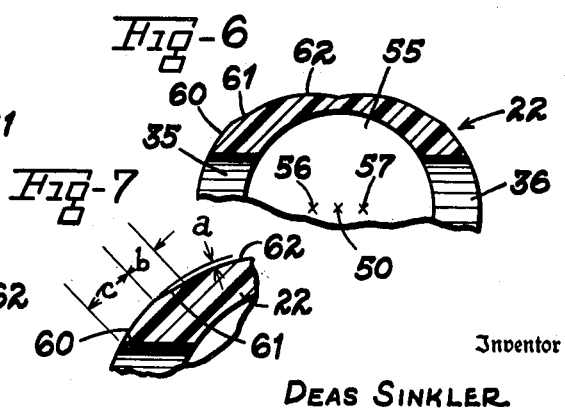
Inventor
DEAS SINKLER
Mareschal & Biebel
Attorneys

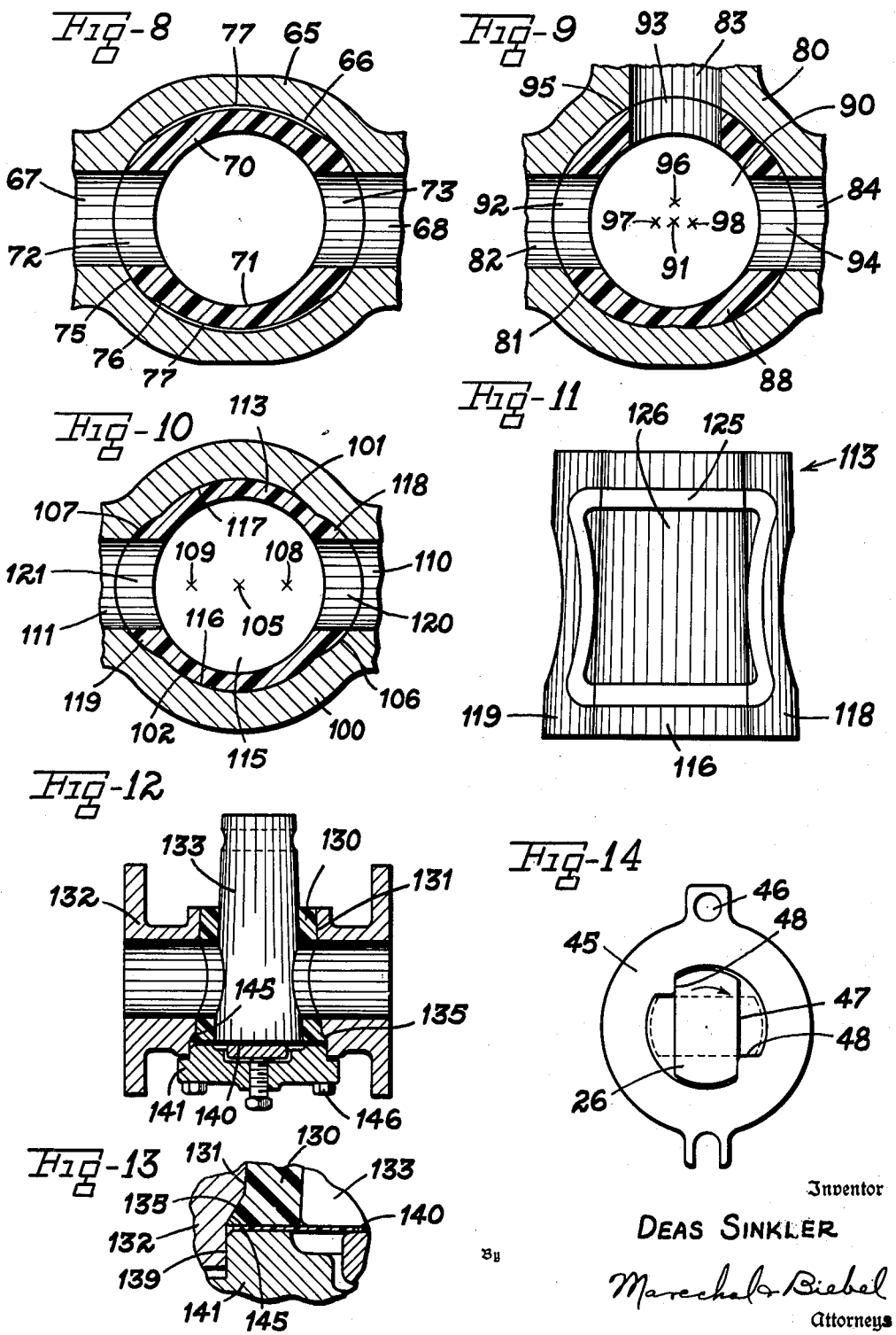

Dec. 27, 1955 D. SINKLER 2,728,550
VALVE FOR CORROSIVE FLUIDS
Filed May 16, 1951 3 Sheets-Sheet 3
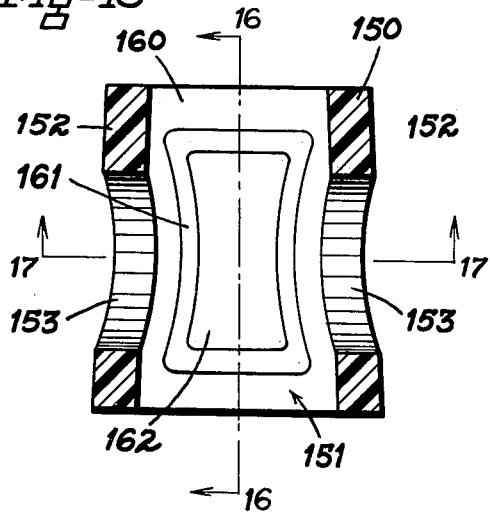
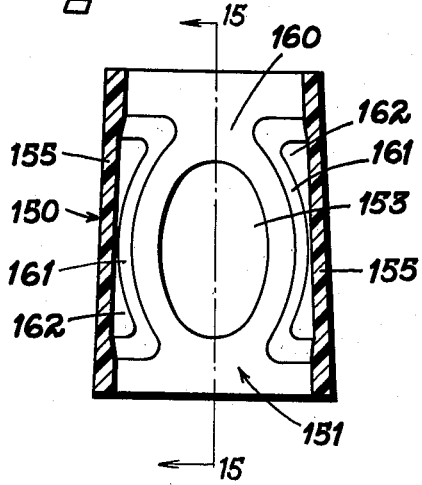
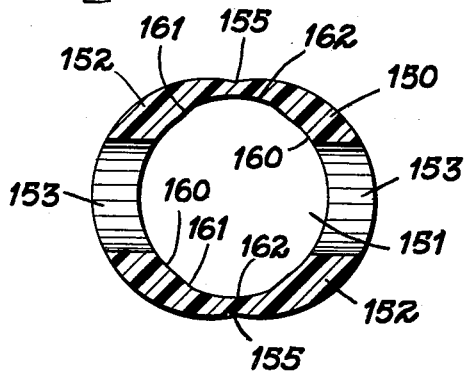
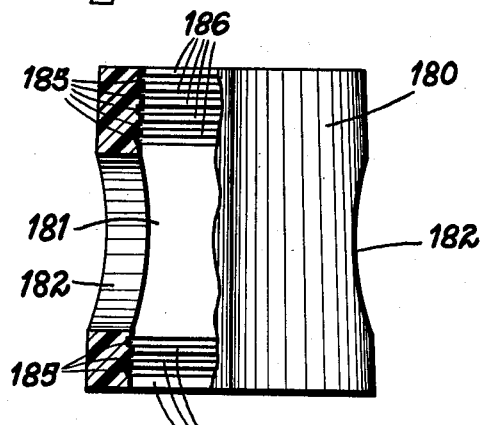
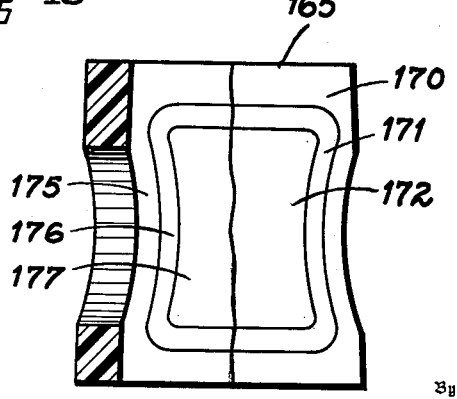
Inventor
DEAS SINKLER
By Marechal & Biebel
Attorneys

United States Patent Office 2,728,550
Patented Dec. 27, 1955

2,728,550

VALVE FOR CORROSIVE FLUIDS

Deas Sinkler, Dayton, Ohio, assignor to The Duriron Company, Inc., Dayton, Ohio, a corporation of New York Application May 16, 1951, Serial No. 226,689

16 Claims. (Cl. 251—317)

This invention relates to plug valves, and particularly to valves adapted to control the flow of corrosive fluids and utilizing a molded liner which is highly resistant to corrosion and which has good sealing properties in the absence of lubricant.

It is highly important in valves of this type that the liner be adequately locked in the valve body to assure both that the liner will not tend to turn with the plug and also that the liner will not interfere with proper turning of the plug. Any such turning or twisting of the liner is objectionable from the standpoint of partially obstructing the valve ports, and also it may allow seepage of the fluid to occur either circumferentially or axially of the liner resulting in a leaky and unsatisfactory condition.

In addition, it is important in valves of this character, particularly in handling corrosive fluids, that adequately high sealing pressure be maintained radially between the plug and the body in the areas adjacent the inner ends of the flow passages in the body, and this is especially important under operating conditions wherein the plug is only partially opened. Under such conditions, it will be apparent that portions of the liner at its junction with the body are unsupported on the inside by the plug and therefore are subject to possible seepage between the liner and body by the fluid flowing through the valve, especially on the high pressure side of the valve, and it is important for best results that the possibility of such seepage be effectively prevented.

These conditions of possible twisting of the liner and also of possible seepage in the port areas tend to increase in severity with the size of the valves. Thus in valves of smaller sizes, such as valves wherein the flow passages are of the order of one inch in diameter or less, highly satisfactory results have been obtained with liners formed of the polytetrafluoroethylene material commercially available under the name of Teflon and locked in place within the valve body by means of locking rings engaging the ends of the liners as disclosed in the copending applications of Robert C. Schenck, Serial No. 146,645, filed February 28, 1950, now Patent No. 2,713,987, issued July 26, 1955, and Serial No. 176,600, filed July 29, 1950, both assigned to the same assignee as this application. Other plastic materials such, for example, as neoprene and Saran, as well as corrosion resisting metals such as lead, have also been found satisfactory for use as valve liners of this type.

Under some conditions, however, and particularly in valves of larger sizes such as valves wherein the flow passages are of the order of two inches or more in diameter, more severe conditions both of pressure and of possible twisting and frictional resistance are encountered where the areas involved are so materially increased as compared with the valves of smaller sizes. Since the total area of contact between the plug and the liner is greatly increased, there is a corresponding increase in friction therebetween tending to cause twisting of the liner with the plug. Also, with the circumferences of the ports similarly increased, the effective length of the junctions between the liner and the plug and body at the ports is such that unless a high pressure condition is maintained at all times between the plug and body in areas which completely surround the inner ends of the flow passages, serious problems of seepage and the development of pockets of corrosive fluid within the valve may occur, as well as possible deformation of the liner into the plug ports, especially in partly open positions of the plug.

It is accordingly one of the principal objects of the present invention to provide a plug valve of the above character incorporating a plastic liner of low friction and self-lubricating material, which is so constructed that the liner and valve body are effectively interlocked against relative angular movement throughout the entire length and circumference of the liner, and which is also so constructed that properly high sealing pressure is maintained between the plug and body in the areas surrounding the inner ends of the flow passages in the body in all positions of the plug without interfering with the desired free turning of the plug in operation.

These results are obtained in accordance with the invention by a special construction of the liner and valve body wherein the liner is formed with a circularly tapered (frusto-conical) bore for the plug but with a non-circular outer periphery composed of thick portions extending lengthwise from end to end of the liner and alternating with portions of substantially reduced thickness similarly extending from end to end of the liner. The ports or flow passages for the liner are formed in these thick portions, and the bore in the valve body is contoured with a symmetrically non-circular cross-sectional outline complementary with the outer periphery of the liner so that the thick portions of the liner and the flow passages therethrough will properly match the flow passages in the body. Thus not only is the liner effectively interlocked with the body over its entire length and circumference, but the thickest portions of the liner are located in surrounding relation with the inner ends of the flow passages in the body to provide both maximum stiffness in the liner adjacent the flow passages as well as effective unit sealing pressure between the body and the plug in the areas surrounding the flow passages.

It has also been discovered in accordance with the invention that with the desired high sealing pressure established around the ports and flow passages as described, it is possible and practicable to provide reduced unit sealing pressure between the plug and body in areas intermediate the flow passages in the body without affecting the desired high unit sealing pressure at the flow passages, and at the same time to provide materially reduced friction between the liner and the plug and a correspondingly reduced tendency for twisting of the liner in the operation of the plug. This result is obtained in accordance with the invention by providing relief areas on one or both surfaces of the liner spaced between the ends thereof and the flow passages therethrough, with these relief areas being carefully proportioned to minimize the possibility of seepage or pocketing of the fluid being handled by the valve while at the same time providing the desired conditions of reduced unit pressure and friction in those parts of the valve which are comparatively remote from direct exposure to line pressure.

It is accordingly a further object of the invention to provide a plug valve of the above character which incorporates a preformed plastic liner having a tapered plug receiving bore and having its cross-sectional outline composed of axially extending thick portions having flow passages therethrough and thinner portions intermediate the thick portions and defining therewith a noncircular outer periphery for the liner adapted to be received in axially and circumferentially continuously interlocked relation with a bore of complementary cross-sectional outline in the valve body having flow passages therein arranged to match the flow passages in the liner and thus to locate the thickest portions of the liner in the areas surrounding the inner ends of the flow passages in the body.

An additional object of the invention is to provide a valve of the above character wherein the liner is provided with relief areas in portions of the surface thereof spaced between the ends thereof and between the flow passages therethrough for reduced unit pressure and reduced friction with respect to the valve plug in operation.

It is also an object of the invention to provide a lined plug valve of the above type which is of generally improved and simplified construction including complementary portions on the liner and the valve body which cooperate to lock the liner against axial movement without requiring a retainer for the smaller end of the liner.

Other objects and advantages of the invention will be apparent from the following description, the accompanying drawings, and the appended claims.

In the drawings—

Fig. 1 is a sectional view through a two-way plug valve constructed in accordance with the present invention, the view being in section on the line 1—1 of Fig. 2;

Fig. 2 is a section on the line 2—2 of Fig. 1;

Fig. 3 is a transverse section on the line 3—3 of Fig. 1 with the plug in an intermediate position;

Fig. 4 is a detail view of the liner in the valve of Figs. 1 to 3, the view being partly in side elevation and partly broken away in vertical section;

Fig. 5 is a view similar to Fig. 4 and at right angles thereto with the liner shown partly in side elevation and partly broken away in vertical section;

Fig. 6 is a fragmentary section on the line 6—6 of Fig. 4;

Fig. 7 is an enlarged view of a fragment of Fig. 6;

Fig. 8 is a transverse section similar to Fig. 6 and showing another construction of liner in accordance with the invention for use in a two-way valve;

Fig. 9 is a sectional view similar to Fig. 8 showing a construction of a liner in accordance with the invention for use in a three-way valve;

Fig. 10 is a sectional view similar to Fig. 8 showing another construction of liner in accordance with the invention for use in a two-way valve;

Fig. 11 is a side elevation of the liner of Fig. 10;

Fig. 12 is a sectional view through another form of lined valve constructed in accordance with the invention wherein the liner and valve both have complementary chamfered portions for limiting axial movement of the liner;

Fig. 13 is an enlarged view of a fragment of Fig. 12;

Fig. 14 is a detail top view of the retainer and plug stem of the valve of Figs. 1 to 3;

Fig. 15 is a section on the line 15—15 of Fig. 16 showing a further construction of liner in accordance with the invention for use in a two-way valve;

Figs. 16 and 17 are sections on the lines 16—16 and 17—17 respectively of Fig. 15; and Figs. 18 and 19 are views similar to Fig. 4 showing still other constructions of liners in accordance with the invention.

Referring to the drawings, which illustrate preferred embodiments of the invention, the valve body 20 in Figs. 1 to 3 has a transverse tapered bore 21 for receiving the liner 22 and frusto-conical plug 25, i. e., the plug is tapered in the direction of its length and is circular in cross-section. At the upper end of the plug is a stem portion 26 provided with flats 27 on each side thereof for interlocking engagement with an operating handle. The valve body 20 is formed with flow passages 30 and 31 adapted to be connected upon turning of the plug by the transversely extending port 33 in the plug, and the liner 22 is provided with similar flow passages 35 and 36 matching the flow passages in the body.

The lower end of the valve body 20 is provided with an enlarged counterbore 38 to receive a thrust diaphragm 39 and cap 40, shown as adjustably secured to the body by means of bolts 41 to provide the desired press fit of the liner 22 in bore 21 for close sealing engagement. The cap 40 carries an adjustable stud 42 having a lock nut 43 and engaging a thrust disk 44 which has direct contact with the thrust diaphragm 39 and through it with the plug 25 to provide separate adjustment of the pressure on the plug independently of the adjustment of the cap 40. The upper end of the valve body 20 is provided with an annular retainer 45 bolted thereto at 46 and arranged to extend radially inwardly to provide an overhanging shoulder 47 which serves to limit upward movement of the liner 22. The retainer 45 is provided with shoulders 48 (Fig. 14) for abutting engagement with the flats 27 on the plug stem 26 to serve as stops limiting movement of the plug to substantially 90° and establishing accurately predetermined open and closed positions of the plug.

As best shown in Fig. 3, the bore 21 in the body 20 has a central axis 50 and is contoured with a symmetrical non-circular outline in cross-section, and in the form shown this outline is composed of portions of two intersecting circles each somewhat greater than 180° in angular extent and arranged with their respective centers 51 and 52 spaced from each other and on opposite sides of the central axis 50 of the bore. This provides the maximum width of the bore in the central plane of the flow passages 30 and 31. In the direction of the length of the liner, the bore is tapered and thus in the corresponding sectional view of Fig. 1 it will be seen that the bore is in the form of a double conical surface with the center line of each conical portion spaced from the axis of the bore.

The liner 22 is shown in detail in Figs. 4 to 7 and is preferably formed of the above noted Teflon material. It has a tapered bore 55 of circular cross-section for close fitting engagement with the tapered outer surface of the plug 25, but its tapered outer surface is of symmetrical non-circular cross-sectional shape substantially complementary with the contoured surface of the bore 21. Thus as shown in Fig. 6, the cross-sectional outline of the liner is formed from portions of two circles having their centers 56 and 57 located in spaced relation with each other and on opposite sides of the central axis 50 of the bore 55. Accordingly, when the liner is inserted in place within the bore 21, its non-circular peripheral surface will closely conform with and interlock in bore 21 throughout its entire axial and circumferential extent.

This contoured construction of the bore 21 and the outer surface of the liner results in providing in the liner portions of substantial thickness which extend from end to end of the liner in alternating relation with portions of substantially reduced thickness. Also, this construction has the further result of locating the flow passages 35 and 36 in the thickest portions of the liner, and thus the maximum section of the liner material is located in these passage-surrounding portions. As a result, the portion of the liner adjacent each flow passage in the body is effectively stiffened and self-supporting so that even in a partially open position of the plug such as shown in Fig. 3, it effectively prevents the fluid flowing through the valve from seeping between the liner and body and from deforming the liner material into the partly open plug ports.

If the liner is contoured to an initially precise fit with all parts of the bore and plug surfaces, then a given linear amount of deformation under operating pressures will cause the maximum percentage of deformation in the portions of the liner which are of minimum section, since the same linear amount of deformation will be a greater percentage of a thin section of a thicker section. In other words, under such conditions of precise fit, the actual unit pressures will be greatest in the portions of the liner of minimum section, which as shown are intermediate the flow passages in the body. Preferred results in operation from the standpoint of reduced frictional resistance to the turning of the plug without affecting the desired high sealing pressure at the flow passages are therefore obtained in accordance with the invention by providing relief areas of relatively lower unit sealing pressure in portions of the valve intermediate the flow passages in the body and also intermediate the ends of the liner. This result is obtained as shown particularly in Figs. 4–7 by forming the outer surface of the liner in a contoured area carefully proportioned between the ends of the liner and the flow passages therethrough and carefully controlled in thickness to maintain sealing contact with the surface of the bore in the body but with reduced unit pressure as compared with the high unit pressure sealing areas immediately adjacent the flow passages.

One of these high pressure sealing areas is provided on each side of the liner as indicated at 60 and is curved on the center line 56 or 57 for a predetermined minimum distance beyond the adjacent flow passage 35 or 36 to provide a curved and tapered surface which also extends the full length of the liner above and below the flow passages as shown in Figs. 4 and 5 and matches the curvature and taper of the adjacent surface of bore 21 for close fitting engagement therewith. Within this circularly tapered surface 60 on each side of the liner is an inwardly tapered marginal surface area 61, and within the tapered surface 61 is a further circularly tapered low pressure surface area 62 entirely enclosed within the boundaries of the high pressure area 60, having its radius reduced by a predetermined small amount in accordance with the size of the valve and liner with respect to the radius of the surface portions 60. For example, satisfactory results have been obtained with a Teflon liner 22 of the proportions shown for a two-inch valve with the area 62 reduced in radius by approximately 0.020 inch with respect to the area 60 as indicated at *a* in Fig. 7, and with the areas 60 and 61 respectively 0.375 and 0.25 inch in minimum width as indicated at *b* and *c* respectively in Fig. 7. These areas of reduced pressure may be cast in the liner, or they may be formed by a grinding operation on a liner formed initially of uniformly matching dimensions with respect to the bore 21.

When the liner constructed as described is inserted in place in the bore 21 and subjected to axial pressure through the cap 40, it will be urged into closely interlocked relation with the inner surface of bore 21 throughout its entire length, and when the plug is similarly inserted and pressed into place, there will be maximum unit sealing pressure between the plug and bore 21 across all the areas 60 of the liner. At the same time, with the relief provided at the areas 62, there will be reduced unit pressure between the plug and bore 21 across these areas 62, although under the normal pressure conditions in operation there will be no clearance or space at any point but merely sealing engagement at a reduced pressure in the areas 62 as compared with the areas 60, due to the reduced deformation in these areas 62 with respect to the areas 60, and the areas 61 provide smooth merging of one area into the other. Thus while proper sealing is maintained at all times and no pockets are permitted where fluid might collect, the reduced unit pressure provided by the areas 62 causes corresponding reduction of the friction between the plug and the inner surface of the bore in the liner so that turning of the plug is facilitated while the tendency for the liner to twist is materially reduced, which in turn contributes both to ease of operation of the valve and to increased operating life for the liner.

The above advantages of proper sealing pressure and efficient operation are also obtainable with other contoured arrangements of the bore in the valve body in accordance with the present invention. For example, Fig. 8 shows a valve body 65 having an elliptically contoured bore 66 and a pair of flow passages 67 and 68. The liner 70 in Fig. 8 has a circularly tapered central bore 71 for receiving the plug, but its outer periphery is generally elliptical, with the flow passages 72 and 73 being located in the widest portions thereof. This construction of valve provides the same advantages of maximum section of the liner immediately adjacent the flow passages as described in connection with Figs. 1 to 7, and Fig. 8 also shows the outer surface of the liner as provided with the relief areas described in connection with Fig. 7, the outer surface of the liner in Fig. 8 having similar high pressure areas 75, tapered marginal areas 76 and low pressure or pressure relief areas 77. The respective dimensions given as illustrative in connection with Fig. 7 are applicable also to the liner 60, and it should be noted that while the surface areas 77 are shown as spaced from the surface of bore 66, in use these areas will be in pressure sealing contact although at lower unit pressure than the areas 75.

Fig. 9 shows a construction of three-way valve body 80 in accordance with the invention having a contoured bore 81 of symmetrical non-circular cross-section provided with three flow passages 82, 83 and 84. The liner 88 in Fig. 9 includes a circularly tapered central bore 90 for receiving the plug, and the central axis of bores 81 and 90 is indicated at 91. Flow passages 92, 93 and 94 match the flow passages 82, 83 and 84 in the valve body, and in order to provide the desired thick section in the liner adjacent the middle flow passages 83 and 93, the portions 95 of the bore 81 and the outer surface of the liner are curved about a center 96 spaced in substantially the same relation with the central axis 91 of bore 90 as the centers 97 and 98 of the curved outer surface areas surrounding the flow passages 82 and 84 respectively. The bore 81 and the outer surface of liner 88 opposite the flow passage 83 are shown as of substantially the same configuration as the corresponding portions of the bore 21 and liner 22, and the liner surface may be similarly provided with relief areas as described in connection with Fig. 7.

Figs. 10 and 11 show another construction of valve body 100 in accordance with the invention having a contoured bore of still another cross-sectional outline. In Fig. 10, the surface portions 101 and 102 of the bore are curved on the central axis 105 of the bore. Surface portions 106 and 107, however, are curved about centers 108 and 109, respectively, spaced from each other and from the axis 105, and the flow passages 110 and 111 are located as shown in these surface portions 106 and 107. The liner 113 has a circular tapered bore 115 for receiving the plug, and its outer surface is of symmetrical non-circular outline in cross-section complementary with the bore in valve body 100 for the desired closely interlocking fit therein. Thus the surface portions 116 and 117 of the liner are curved about the central axis 105, but the surfaces 118 and 119 are curved about centers 108 and 109 to provide thick portions of maximum section through which are formed the flow passages 120 and 121. Reduced turning friction may be provided in the liner 113 by having less press fit between the thinner portions of the liner and the bore in the valve body than the thicker wall portions, for example 0.010 inch less in the bores 101 and 102 than in the bores 106 and 107. Alternatively, the portions of the outer surface of this liner intermediate the flow passages and the ends of the liner may be provided with relief areas as shown in Fig. 11, wherein the surface portion 125 corresponds with the tapered portion 61 in Figs. 4–7 and the surface area 126 similarly corresponds with the areas 62 in Figs. 4 to 7.

Figs. 12 and 13 show a different construction for retaining the liner 130 against axial movement in the tapered and contoured bore 131 of a valve body 132 equipped with a tapered valve plug 133. The larger end of the valve body 132 is provided with a chamfer 135 intermediate the tapered bore 131 and the enlarged counterbore 139 for receiving the thrust diaphragm 140 and cap 141. The liner 130, which is contoured as described to fit the contoured bore 131, has an upset portion at its larger end forming a beveled flange 145 adapted to fit against the chamfer 135. Accordingly, when the cap 141 is tightened in place by means of the bolts 146, this flange portion 145 of the liner is effectively locked against the chamfer 135 to limit axial movement of the liner without the use of an additional retainer at the smaller end of the liner. It will be apparent that this construction of the valve body and liner is applicable to any of the several forms of contoured bore described in connection with Figs. 1 to 11.

Figs. 15 to 17 show a further construction of liner 150 similar to that shown in Figs. 4 to 7 but having the areas of reduced pressure located within the bore 151. This liner 150 is generally of the same shape as the liner 22 and has its outline in cross-section composed of portions of two intersecting circles each greater than 180° in angular extent to provide thick wall portions 152 adjacent the flow passages 153 and thin wall portions 155 between these portions 152. The inner surface of each of the thinner wall portions 155 is contoured as shown with a portion 160 forming a high pressure sealing area curved on substantially the same radius and center as the matching surface of the plug with which this liner is to be used. Within this high pressure area 160 is an inwardly tapered marginal surface area 161 merging with the low pressure surface area 162, which as shown in Fig. 17 is curved on a larger radius but the same center as the corresponding portions of the surface area 160.

This construction of the liner 150 provides similar advantages to those of the construction of the liner 22 as described, in that desired high unit sealing pressure is maintained in the areas of the liner surrounding the ports and flow passages, while the reduced unit sealing pressure across the areas 162 provides lowered friction and resistance to turning of the plug in use. It is also practicable in accordance with the invention to provide these contoured high and low pressure areas on both the inside and outside surfaces of a liner as shown on the liner 165 in Fig. 18, wherein the outer surface of the liner has high unit pressure areas 170, tapered marginal areas 171 and low unit pressure areas 172 similar to the areas 60, 61 and 62 as previously described, and the bore of the liner is similarly provided with high unit pressure areas 175, tapered marginal areas 176 and low unit pressure areas 177 corresponding to the similar showing in Figs. 15 to 17.

Fig. 19 shows a further construction of liner 180 in accordance with the invention having high and low sealing pressure areas on the surface of its bore 181, this liner 180 being otherwise shown of the same general configuration as the liners 22 and 150. At each end of the bore 181, spaced beyond the flow passages 182, is a series of cylindrical grooves 185 in a labyrinth arrangement providing low unit pressure areas and separated by cylindrical lands 186 forming high unit sealing pressure areas. This construction provides reduced frictional resistance between the liner and plug without detracting from the desired effective high unit sealing pressure adjacent the flow passages, a satisfactory depth of the grooves 185 with respect to the adjacent lands 186 being approximately 0.020 inch.

It should be noted in connection with all of the several forms of contoured liners as described above that it is not essential for the purposes of the invention that the liners be constructed of materials having self-lubricating properties or that the valve be maintained entirely free of lubricant. On the contrary, it may be found desirable to employ a lubricating material but primarily for the purpose of reducing friction against proper turning of the plug, as contrasted with lubricated valves wherein a lubricant having relatively poor anti-frictional properties is employed for increased sealing effect. In valves of the construction disclosed herein, particularly in larger sizes of valves or where the liner is formed of a material such as rubber, Saran or lead having comparatively inferior anti-frictional properties, it may be found desirable to employ a lubricant to reduce turning friction, preferably a colorless, odorless, tasteless and non-toxic lubricant such for example as mineral oil or the like of a type ordinarily considered unsuitable for use in a lubricated valve because of insufficient body to seal and maintain a cushion between the plug and bore. However, where the valve includes a liner constructed in accordance with the present invention, adequate sealing is maintained without a lubricant, and the only purpose for the lubricant would be to decrease frictional resistance to turning of the plug in the operation of the valve.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A corrosion resisting plug valve comprising a valve body having a tapered bore extending transversely thereof and flow passages opening into said bore, a frustoconical plug having a port therethrough adapted to be aligned with said flow passages, said bore having a non-circular outline in radial cross-section composed of a plurality of portions arranged at respectively greater and lesser distances from the central axis of said bore, said flow passages having the inner ends thereof located in selected said portions of the surface of said bore at the maximum distances from said axis, a tapered liner of deformable material having high corrosion resistance adapted to be received in said bore in said body, said liner having a non-circular outer periphery in radial cross-section substantially complementary to said outline of said bore to interfit with said bore in circumferentially interlocked relation throughout substantially the entire length and periphery thereof, said liner having a tapered bore therein for receiving said plug and having flow passages therethrough matching said flow passages in said body, said bore in said liner being circular in radial cross-section for close fitting engagement with said plug around the entire circumference thereof and being located centrally of said liner to provide portions of relatively different thickness in the wall of said liner with those of said portions which are of maximum section located immediately adjacent said flow passages in said liner for effective sealing at high unit pressure between said plug and said body in the areas adjacent said flow passages, said liner having a relieved area located in a surface of at least one of said thinner walled portions thereof at a position spaced between said flow passages and between the ends of said liner, and means for effecting continuous compression of said liner between said plug and said body to eliminate cavities therebetween by deforming said liner into continuous pressure contact with said plug and said body over substantially its entire inner and outer surfaces but with reduced unit sealing pressure across said relieved area for decreased friction between said liner and said plug.

2. A corrosion resisting plug valve comprising a valve body having a bore extending transversely thereof and flow passages extending through said body and surface portions of said bore, a frusto-conical plug having a port therethrough adapted to be aligned with said flow passages, said bore having a non-circular outline in radial cross-section with said surface portions thereof having said flow passages therein being spaced at greater distances from the central axis of said bore than the surface portions intermediate said flow passages, a liner of deformable material having high corrosion resistance adapted to be received in said bore in said body, said liner having a non-circular outer periphery in radial cross-section substantially complementary to said outline of said bore to interfit with said bore in circumferentially interlocked relation throughout substantially the entire length and periphery thereof, said liner having a centrally located frusto-conical bore therein proportioned to receive said plug in close fitting engagement around the entire circumference thereof and providing portions of different radial section in the wall of said liner with the thickest portions thereof located in the portions of said bore and said body having said flow passages therein, said thickest portions of said liner wall having flow passages therethrough matching said flow passages in said body to provide the maximum section of said liner for effective sealing at high unit pressure between said plug and said body in the areas adjacent said flow passages, said liner having a relieved area in at least one of the inner and outer surfaces thereof at a position spaced between said flow passages and between the ends of said liner, and means for effecting continuous compression of said liner between said plug and said body to eliminate cavities therebetween by deforming said liner into continuous pressure contact with said plug and said body over substantially its entire inner and outer surfaces but with reduced unit sealing pressure across said relieved area for decreased friction between said liner and said plug.

3. A corrosion resisting plug valve comprising a valve body having flow passages therethrough and a bore extending transversely thereof, a frusto-conical plug having a port therethrough adapted to be aligned with said flow passages, said bore having a non-circular outline in radial cross-section formed of a plurality of curved portions having their respective centers spaced from the central axis of said bore, said flow passages having the inner ends thereof located in selected said portions of the surface of said bore furthest from said axis, a liner of deformable material having high corrosion resistance adapted to be received in said bore in said body, said liner having a noncircular outer periphery substantially complementary to said outline of said bore to interfit with said bore in circumferentially interlocked relation throughout substantially the entire length and periphery thereof, said liner having a centrally located frusto-conical bore therethrough for receiving said plug in close fitting engagement around the entire circumference thereof and providing portions of different radial section in the wall of said liner with the thickest portions thereof located in the portions of said bore and said body having said flow passages therein, said thickest portions of said liner wall having flow passages therethrough matching said flow passages in said body to provide the maximum section of said liner for maximum stiffness in the sections thereof between said plug and said body in the areas adjacent said flow passages and which are unsupported by said plug in partly opened positions thereof, means for effecting continuous compression of said liner between said plug and said body to eliminate cavities therebetween by deforming said liner into continuous pressure contact with said plug and said bore over substantially its entire inner and outer surfaces, and means for establishing a positive lower unit pressure between said liner and the surface of said plug at a position spaced between said flow passages and between the ends of said liner.

4. A corrosion resisting plug valve comprising a valve body having a tapered bore and flow passages opening into said bore, a frusto-conical plug having a port therethrough adapted to be aligned with said flow passages, said bore having a noncircular outline in radial cross-section formed of a plurality of portions curved about axes located eccentrically of the central axis of said bore and spaced at different distances from said central axis of said bore, said flow passages having the inner ends thereof located in selected said portions of said bore surface furthest from said axis, a tapered liner of deformable material adapted to be received in said bore, said liner having a noncircular outer periphery in radial cross-section substantially complementary to said outline of said bore to interfit therewith in circumferentially interlocked relation, said liner having a tapered bore therein for receiving said plug and having flow passages therethrough matching said flow passages in said body, said bore in said liner being frusto-conical for close fitting engagement with said plug around the entire circumference thereof and being located centrally of said liner to provide portions of relatively different thickness in the wall of said liner with the portions of maximum section located immediately adjacent said flow passages in said liner, the outer surfaces of said portions of maximum section being curved on substantially the same radius and center as the matching surface portions of said bore in said body, at least one area on the outer surface of said liner intermediate the ends thereof and intermediate said flow passages being curved concentrically with the matching portion of said bore but on a slightly lesser radius in the uncompressed condition of said liner, means for effecting continuous compression of said liner between said plug and said body deforming said liner into continuous contact with said plug and said body over substantially its entire inner and outer surfaces to eliminate cavities therebetween, and said area of lesser radius being proportioned for cooperation with said compression effecting means to provide reduced unit pressure in said area as compared with the unit pressure between said plug and said body in the areas of said liner immediately adjacent said flow passages while maintaining sealing engagement of said liner with said bore over the entire outer surface of said liner.

5. A corrosion resisting plug valve comprising a valve body having a tapered bore and flow passages opening into said bore, a frusto-conical plug having a port therethrough adapted to be aligned with said flow passages, said bore having a noncircular outline in radial cross-section formed of a plurality of portions curved about axes located eccentrically of the central axis of said bore and spaced at different distances from said central axis of said bore, said flow passages having the inner ends thereof located in selected said portions of said bore surface furthest from said axis, a tapered liner of deformable material adapted to be received in said bore, said liner having a noncircular outer periphery in radial cross-section substantially complementary to said outline of said bore to interfit therewith in circumferentially interlocked relation, said liner having a tapered bore therein for receiving said plug and having flow passages therethrough matching said flow passages in said body, said bore in said liner being frusto-conical for close fitting engagement with said plug around the entire circumference thereof and being located centrally of said liner to provide portions of relatively different thickness in the wall of said liner with the portions of maximum section located immediately adjacent said flow passages in said liner, the outer surfaces of said portions of maximum section being curved on substantially the same radius and center as the matching surface portions of said bore in said body, at least one area on the inner surface of said liner intermediate the ends thereof and intermediate said flow passages being curved concentrically with the matching portion of said plug but on a slightly greater radius in the uncompressed condition of said liner, means for effecting continuous compression of said liner between said plug and said body deforming said liner into continuous contact with said plug and said body over substantially its entire inner and outer surfaces to eliminate cavities therebetween, and said area of lesser radius being proportioned for cooperation with said compression effecting means to provide reduced unit pressure in said area as compared with the unit pressure between said plug and said body in the areas of said liner immediately adjacent said flow passages while maintaining sealing engagement of said liner with said bore over the entire outer surface of said liner.

6. A corrosion resisting plug valve comprising a valve body having flow passages therethrough and a bore extending transversely thereof, a frusto-conical plug having a port therethrough adapted to be aligned with said flow passages, a liner of deformable material having high corrosion resistance adapted to be received in said bore in said body, said liner having a bore therein for receiving said plug and having flow passages therethrough matching said flow passages in said body, said liner bore being frusto-conical for close fitting engagement with said plug around the entire circumference thereof, means for retaining said liner within said bore in said body preventing turning thereof with said plug, said liner including portions of greater section adjacent the inner ends of said flow passages in said body to provide maximum stiffness in the sections thereof between said plug and said body in the areas of said bore in said body surrounding the inner ends of said flow passages and which are unsupported by said plug in partly opened positions thereof, means for effecting continuous compression of said liner between said plug and said body deforming said liner into continuous contact with said plug and said body over substantially its entire inner and outer surfaces to eliminate cavities therebetween, and said liner including an area of reduced section intermediate said flow passages proportioned for cooperation with said compression effecting means to provide reduced unit sealing pressure in said area and reduced friction between said liner and said plug while preventing clearance or space at any point between the surface of said liner and the surfaces of said bore and said plug.

7. A corrosion resisting plug valve comprising a valve body having flow passages therethrough and a bore extending transversely thereof, a frusto-conical plug having a port therethrough adapted to be aligned with said flow passages, a liner of deformable material having high corrosion resistance adapted to be received in said bore in said body, said liner having a frusto-conical bore therein for receiving said plug and having flow passages therethrough matching said flow passages in said body, means for retaining said liner within said bore in said body preventing turning thereof with said plug, said liner having portions thereof formed for close fitting engagement with the portions of the adjacent walls of the bore in which it is received providing a sealing area of relatively high unit pressure surrounding said flow passages and an intermediate area entirely enclosed within the boundaries of said high pressure area relieved with respect to the wall of said bore in the uncompressed condition of said liner, means for effecting continuous compression of said liner between said plug and said body deforming said liner into continuous contact with said plug and said body over substantially its entire inner and outer surfaces to eliminate cavities therebetween, and said relieved intermediate area of said liner being proportioned for cooperation with said compression effecting means to provide a lower unit pressure therein and reduced friction between said liner and said plug while preventing clearance or space at any point between the surface of said liner and the surfaces of said bore and said plug.

8. A corrosion resisting plug valve comprising a valve body having flow passages therethrough and a bore extending transversely thereof, a frusto-conical plug having a port therethrough adapted to be aligned with said flow passages, a liner of deformable material having high corrosion resistance adapted to be received in said bore in said body, said liner having a frusto-conical bore therein for receiving said plug and having flow passages therethrough matching said flow passages in said body, means for retaining said liner within said bore in said body preventing turning thereof with said plug, said liner having portions thereof formed for close fitting engagement with the portions of the adjacent wall portions of said plug providing a sealing area of relatively high unit pressure surrounding said flow passages and an intermediate area entirely enclosed within the boundaries of said high pressure area relieved with respect to the wall of said plug in the uncompressed condition of said liner, means for effecting continuous compression of said liner between said plug and said body deforming said liner into continuous contact with said plug and said body over substantially its entire inner and outer surfaces to eliminate cavities therebetween, and said relieved intermediate area of said liner being proportioned for cooperation with said compression effecting means to provide a lower unit pressure therein and reduced friction between said liner and said plug while preventing clearance or space at any point between the surface of said liner and the surfaces of said bore and said plug.

9. A corrosion resisting plug valve comprising a valve body having flow passages therethrough and a bore extending transversely thereof, a frusto-conical plug having a port therethrough adapted to be aligned with said flow passages, a liner of deformable material having high corrosion resistance adapted to be received in said bore in said body, said liner having a frusto-conical bore therethrough for receiving said plug and having flow passages therein matching said flow passages in said body, means for retaining said liner within said bore in said body preventing turning thereof with said plug, said liner including outer surface portions adjacent the inner ends of said flow passages in said body curved on substantially the same radius and center as the corresponding surfaces of said body bore to provide high unit sealing pressure between said plug and said body in the areas of said bore in said body surrounding the inner ends of said flow passages, and said liner also including an outer surface portion intermediate the ends thereof and intermediate said flow passages curved on a lesser radius than the corresponding surface of said body bore in the uncompressed condition of said liner, means for effecting continuous compression of said liner between said plug and said body deforming said liner into continuous contact with said plug and with said body over substantially its entire inner and outer surfaces to eliminate cavities therebetween, and said lesser radius being proportioned with respect to the radius of the corresponding portion of said bore to provide reduced unit sealing pressure in said intermediate liner portion and correspondingly reduced friction between said liner and said plug while preventing clearance or space at any point between the surface of said liner and the surfaces of said bore and said plug.

10. A corrosion resisting plug valve comprising a valve body having flow passages therethrough and a bore extending transversely thereof, a frusto-conical plug having a port therethrough adapted to be aligned with said flow passages, a liner of deformable material having high corrosion resistance adapted to be received in said bore in said body, said liner having a frusto-conical bore therethrough for receiving said plug and having flow passages therein matching said flow passages in said body, means for retaining said liner within said bore in said body preventing turning thereof with said plug, said liner including surface portions adjacent the inner ends of said flow passages in said body curved on substantially the same radius and center as the corresponding surfaces of said body bore and said plug respectively to provide high unit sealing pressure between said plug and said body in the areas of said bore in said body surrounding the inner ends of said flow passages, and said liner also including an inner surface portion intermediate the ends thereof and intermediate said flow passages curved on a greater radius than the corresponding surface of said plug in the uncompressed condition of said liner, means for effecting continuous compression of said liner between said plug and said body deforming said liner into continuous contact with said plug and with said body over substantially its entire inner and outer surfaces to eliminate cavities therebetween, and said greater radius being proportioned with respect to the radius of the corresponding portion of said plug to provide reduced unit sealing pressure in said area and correspondingly reduced friction between said liner and said plug while preventing clearance or space at any point between the surface of said liner and the surfaces of said bore and said plug.

11. A corrosion resisting plug valve comprising a valve body having flow passages therethrough and a bore extending transversely thereof, a frusto-conical plug having a port therethrough adapted to be aligned with said flow passages, a liner of deformable material having high corrosion resistance adapted to be received in said bore in said body, said liner having a frusto-conical bore therein for receiving said plug and having flow passages therethrough matching said flow passages in said body, means for retaining said liner within said bore in said body preventing turning thereof with said plug, said liner including surface portions adjacent the inner ends of said flow passages in said body curved on substantially the same radius and center as the corresponding surfaces of said body bore and said plug respectively to provide high unit sealing pressure between said plug and said body in the areas of said bore in said body surrounding the inner ends of said flow passages, said liner also including a surface portion intermediate the ends thereof and intermediate said flow passages curved on a different radius from the surface in engagement therewith in the assembled relation of said plug and liner in said body bore in the uncompressed condition of said liner, means for effecting continuous compression of said liner between said plug and said body deforming said liner into continuous contact with said plug and said body over substantially its entire inner and outer surfaces to eliminate cavities therebetween, said different radius being proportioned with respect to the radius of said surface in engagement with said intermediate liner surface to provide reduced unit sealing pressure on said intermediate liner surface portion and correspondingly reduced friction between said liner and said plug while preventing clearance or space at any point between the surface of said liner and the surfaces of said bore and said plug and, said liner surface having a tapered marginal area of substantial width surrounding said area of reduced pressure to connect said pressure areas with smoothly maintained pressure engagement with said bore in said body.

12. A plug valve comprising a valve body having a bore extending transversely thereof and flow passages extending through said body and surface portions of said bore, a frusto-conical plug having a port therethrough for alignment with said flow passages, said bore having a non-circular outline in radial section with said surface portions thereof having said flow passages therein spaced at greater distances from the central axis of said bore than the surface portions thereof intermediate said flow passages, each of said greater spaced surface portions extending angularly beyond said flow passage therethrough for a substantial distance to establish a marginal area around said flow passage, a liner of deformable material having a non-circular outer periphery substantially complementary to said bore interfitting with said bore in circumferentially interlocked relation throughout substantially the entire length and periphery thereof and having flow passages therethrough matching said flow passages in said bore, said liner having a frusto-conical bore therein receiving said plug in close fitting engagement around the entire circumference thereof, said liner bore being centrally located in said liner and providing portions of different radial section in the wall of said liner with the thickest portions thereof having said flow passages therethrough to provide the maximum section of said liner in engagement with said marginal areas of said bore surface for maximum stiffness in the sections of said liner surrounding said flow passages and which are unsupported by said plug in partly opened positions thereof, and means for maintaining said liner under deforming compression sufficient to maintain said liner in continuous contact with said plug and said bore over substantially its entire inner and outer surfaces establishing effective sealing pressure between said plug and said body in the areas adjacent said flow passages.

13. A plug valve comprising a valve body having a tapered bore extending transversely thereof and flow passages extending through said body and surface portions of said bore, a frustoconical plug having a port therethrough for alignment with said flow passages, the surface of said bore in radial section being formed of a plurality of curved portions having their respective centers spaced from the central axis of said bore to provide a non-circular outline, said flow passages having the inner ends thereof located in selected said portions of said bore surface furthest from said axis, each of said selected surface portions extending angularly beyond said flow passage therethrough for a substantial distance to establish a marginal area around said flow passage, a tapered liner of deformable material having a non-circular outer periphery substantially complementary to said bore interfitting with said bore in circumferentially interlocked relation throughout substantially the entire length and periphery thereof and having flow passages therethrough matching said flow passages in said bore, said liner having a frusto-conical bore therein receiving said plug in close fitting engagement around the entire circumference thereof, said liner bore being centrally located in said liner and providing portions of different radial section in the wall of said liner with the thickest portions thereof having said flow passages therethrough to provide the maximum section of said liner in engagement with said marginal areas of said bore surface for maximum stiffness in the sections of said liner surrounding said flow passages and which are unsupported by said plug in partly opened positions thereof, and means for maintaining sufficient pressure on said plug to deform said liner into continuous contact with said plug and said bore over substantially its entire inner and outer surfaces establishing effective sealing pressure between said plug and said body in the areas adjacent said flow passages.

14. A plug valve comprising a valve body having a tapered bore extending transversely thereof and a pair of flow passages extending diametrically through said body and surface portions of said bore, a frusto-conical plug having a port therethrough for alignment with said flow passages, the surface of said bore in radial section being formed of a pair of intersecting arcuate portions having their respective centers spaced from the central axis of said bore and of substantially the same angular extent greater than 180° to provide a non-circular outline, said flow passages having the inner ends thereof located in diametrically opposite portions of said bore surface furthest from said axis, a tapered liner of deformable material having a non-circular outer periphery substantially complementary to said bore interfitting with said bore in circumferentially interlocked relation throughout substantially the entire length and periphery thereof and having flow passages therethrough matching said flow passages in said bore, said liner having a frusto-conical bore therein receiving said plug in close fitting engagement around the entire circumference thereof, said liner bore being centrally located in said liner and providing portions of different radial section in the wall of said liner with the thickest portions thereof having said flow passages therethrough to provide the maximum section of said liner surrounding said flow passages therethrough for maximum stiffness in said surrounding portions of said liner which are unsupported by said plug in partly opened positions thereof, and means for maintaining sufficient pressure on said plug to deform said liner into continuous contact with said plug and said bore over substantially its entire inner and outer surfaces establishing effective sealing pressure between said plug and said body in the areas adjacent said flow passages.

15. A plug valve as defined in claim 12 wherein said body has a chamfered portion at the end of said bore adjacent the larger end of said frusto-conical plug, and said liner having a beveled flange at one end thereof adapted to seat on said chamfered body portion to limit the axial movement of said liner in said body.

16. A plug valve as defined in claim 13 wherein said body has a chamfered portion at the larger end of said tapered bore, and said liner having a beveled flange at the larger end thereof adapted to seat on said chamfered body portion to limit the axial movement of said liner in said body under said pressure on said plug.

References Cited in the file of this patent

UNITED STATES PATENTS

| | | |
|---|---|---|
| 218,739 | Hess | Aug. 19, 1879 |
| 461,084 | Pratt | Oct. 13, 1891 |
| 1,946,745 | Johnston | Feb. 13, 1934 |
| 2,295,109 | Hamilton | Sept. 8, 1942 |
| 2,394,243 | Joyce | Feb. 5, 1946 |
| 2,424,210 | Sutton | July 15, 1947 |

FOREIGN PATENTS

| | | |
|---|---|---|
| 9,577 | Great Britain | June 11, 1889 |
| 30,239 | Great Britain | Nov. 9, 1911 |